(12) United States Patent
Khurana et al.

(10) Patent No.: US 11,392,523 B2
(45) Date of Patent: Jul. 19, 2022

(54) ELECTRONIC DEVICE AND OPERATION METHOD OF ELECTRONIC DEVICE

(71) Applicant: Samsung Electronics Co., Ltd., Suwon-si (KR)

(72) Inventors: Guneet Singh Khurana, New Delhi (IN); Wookwang Lee, Suwon-si (KR); Soonho Lee, Suwon-si (KR); Yongseok Jang, Suwon-si (KR); Buseop Jung, Suwon-si (KR); Minjung Kim, Suwon-si (KR); Doosuk Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/957,633

(22) PCT Filed: Jan. 2, 2019

(86) PCT No.: PCT/KR2019/000044
§ 371 (c)(1),
(2) Date: Jun. 24, 2020

(87) PCT Pub. No.: WO2019/135603
PCT Pub. Date: Jul. 11, 2019

(65) Prior Publication Data
US 2021/0056059 A1 Feb. 25, 2021

(30) Foreign Application Priority Data
Jan. 8, 2018 (KR) .................. 10-2018-0002377

(51) Int. Cl.
*G06F 13/38* (2006.01)
*G06F 3/14* (2006.01)
(Continued)

(52) U.S. Cl.
CPC .......... *G06F 13/382* (2013.01); *G06F 13/409* (2013.01); *G06F 13/4022* (2013.01); *G06F 13/4282* (2013.01); *H04W 76/15* (2018.02)

(58) Field of Classification Search
None
See application file for complete search history.

(56) References Cited

U.S. PATENT DOCUMENTS 7,502,878 B1 * 3/2009 Wright ................ G06F 13/4022
710/37
2003/0086433 A1 5/2003 Tordera et al.
(Continued)

FOREIGN PATENT DOCUMENTS

WO 2007/131101 A1 11/2007
WO 2013/147860 A1 10/2013

OTHER PUBLICATIONS

Extended European Search Report dated Dec. 14, 2020, issued in European Application No. 19735920.1.

*Primary Examiner* — Hyun Nam
(74) *Attorney, Agent, or Firm* — Jefferson IP Law, LLP

(57) ABSTRACT

An electronic device according to various embodiments of the present invention can comprise: a housing; a first universal serial bus (USB) connector exposed through a portion of the housing, and including a first port; a plurality of second ports electrically connected with the first port; a third port for providing a plurality of logical wireless sessions; and a control circuit electrically connected with the plurality of second ports and the third port. The control circuit selects one of the second ports, and can provide a communication path between one of the logical wireless sessions and the selected second port in order to perform data communication. Additional various embodiments are possible.

18 Claims, 8 Drawing Sheets

(51) Int. Cl.
*H04W 76/15* (2018.01)
*G06F 13/40* (2006.01)
*G06F 13/42* (2006.01)

(56) References Cited

U.S. PATENT DOCUMENTS

| | | | |
|---|---|---|---|
| 2006/0208066 A1 | 9/2006 | Finn et al. | |
| 2007/0228139 A1* | 10/2007 | Wang | H04N 5/64 |
| | | | 235/375 |
| 2008/0005262 A1 | 1/2008 | Wurzburg et al. | |
| 2008/0005395 A1 | 1/2008 | Ong et al. | |
| 2012/0182939 A1* | 7/2012 | Rajan | G16H 40/40 |
| | | | 370/328 |
| 2013/0031392 A1* | 1/2013 | McLane | H04W 52/0229 |
| | | | 713/323 |
| 2013/0083678 A1* | 4/2013 | Yin | H04W 76/15 |
| | | | 370/252 |
| 2013/0204962 A1 | 8/2013 | Estevez et al. | |
| 2013/0282938 A1 | 10/2013 | Huang et al. | |
| 2014/0201399 A1 | 7/2014 | Brabenac | |
| 2014/0337544 A1 | 11/2014 | Huang et al. | |
| 2015/0046623 A1* | 2/2015 | Ramirez | G06F 13/409 |
| | | | 710/303 |
| 2015/0205744 A1* | 7/2015 | Grossman | G06F 13/4022 |
| | | | 710/316 |
| 2015/0317267 A1* | 11/2015 | Liu | G06F 13/4022 |
| | | | 710/104 |
| 2016/0062932 A1* | 3/2016 | Bhesania | G06F 9/4413 |
| | | | 710/313 |
| 2018/0143932 A1* | 5/2018 | Lawless | G06F 13/4068 |
| 2018/0239729 A1* | 8/2018 | Himanshu | H04L 29/06027 |

\* cited by examiner

US 11,392,523 B2

ELECTRONIC DEVICE AND OPERATION METHOD OF ELECTRONIC DEVICE

TECHNICAL FIELD

Various embodiments of the disclosure relate to: an electronic device capable of relaying data while being connected to devices having different standards; and an operation method of the electronic device.

BACKGROUND ART

Electronic devices may mutually form communication paths by using a communication protocol so as to transmit or receive data. Such a communication protocol may include a universal serial bus (USB) connection. Some examples of peripheral devices that can use a USB connection may include: mass storage devices such as keyboards, digital cameras, printers, personal media players, or flash drives; network adapters; and external hard drives. For most of such devices, a USB is used as a communication protocol to enable connection of peripheral devices.

A wireless serial bus (WSB) is a protocol abstraction layer (PAL) entity that runs a USB through Wi-Fi, and handles the Wi-Fi-related aspects of generating a USB connection, such as the discovery of USB devices that manage the power and management of the connection. A media agnostic USB (MA-USB) is an entity which defines support for all USB transfer types, such as bulk, interrupt, isochronous and control transfers and enumeration of USB devices.

DISCLOSURE OF INVENTION

Technical Problem

An aspect of various embodiments of the disclosure is to provide: an electronic device capable of forming a communication path between a USB device and a Wi-Fi device so as to relay data between the USB device and the Wi-Fi device; and an operation method of the electronic device.

Solution to Problem

An electronic device according to one embodiment of the disclosure may include: a housing; a universal serial bus (USB) connector exposed through a portion of the housing and including a first port; multiple second ports electrically connected to the first port; a third port configured to provide multiple logical wireless sessions; and a control circuit electrically connected to the multiple second ports and the third port, wherein the control circuit may select one of the multiple second ports and may provide a communication path between the selected second port and one of the multiple logical wireless sessions in order to perform data communication.

In accordance with one embodiment of the disclosure, an operation method of an electronic device, which includes a USB connector including a first port, multiple second ports electrically connected to the first port, and a third port configured to provide multiple logical wireless sessions, may include: selecting one of the multiple second ports; and providing a communication path between the selected second port and one of the multiple logical wireless sessions in order to perform data communication.

Advantageous Effects of Invention

In an electronic device and an operation method of the electronic device according to various embodiments of the disclosure, it is possible to relay data between the USB device and the Wi-Fi device by forming a communication path between the USB device and the Wi-Fi device.

In the electronic device and the operation method of the electronic device according to various embodiments of the disclosure, it is possible for a USB device to recognize a Wi-Fi serial bus (WSB) device as a USB device and thus communicate with the WSB device by using conventional USB functions and services.

MODE FOR THE INVENTION

Figure 1:
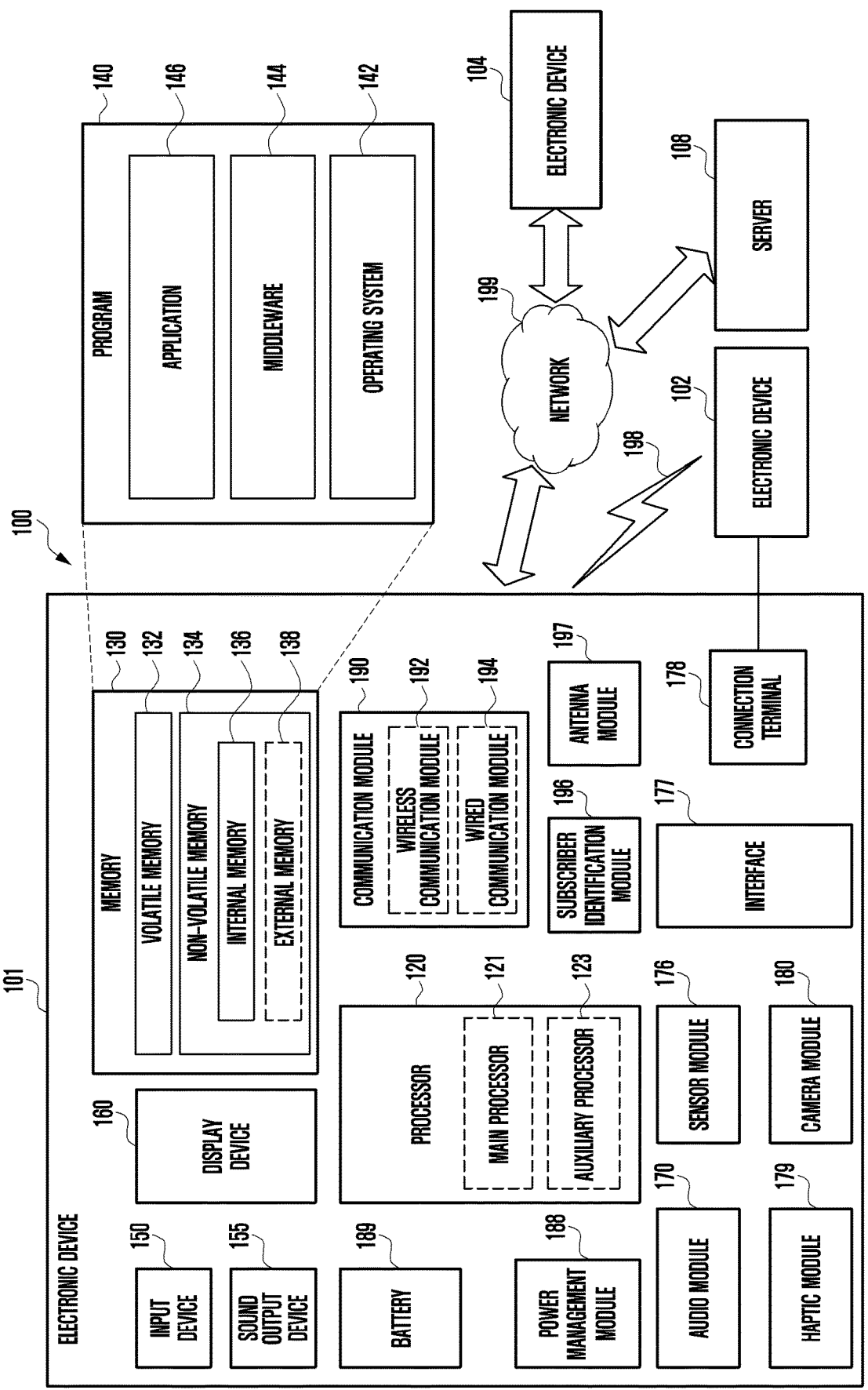
FIG. 1 is a block diagram of an electronic device in a network environment according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas. In such a case, at least one antenna appropriate for a communication scheme used in the communication network, such as the first network 198 or the second network 199, may be selected, for example, by the communication module 190 (e.g., the wireless communication module 192) from the one or more antennas. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
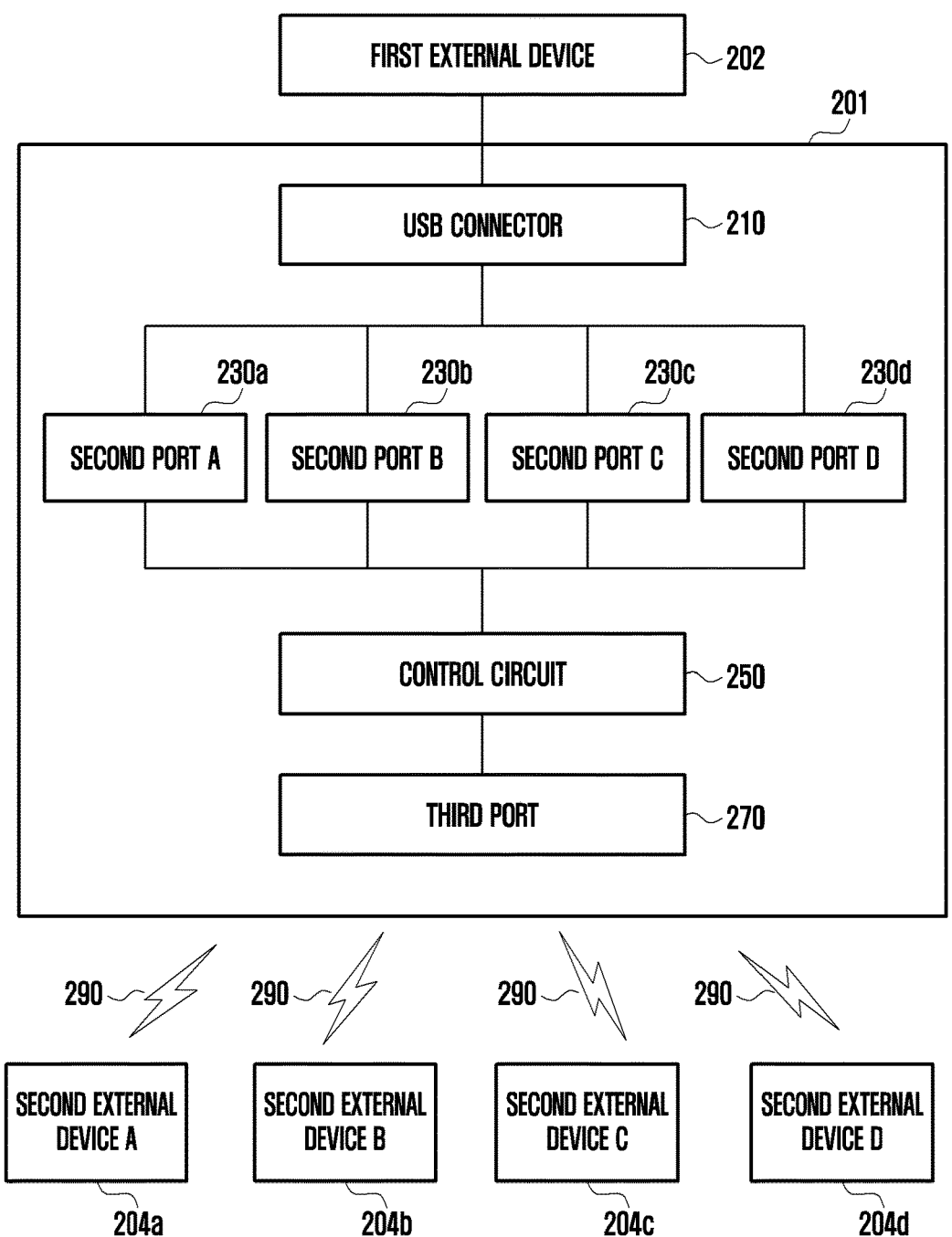
FIG. 2 is a block diagram of an electronic device according to various embodiments of the disclosure.

FIG. 2 is a block diagram of an electronic device according to various embodiments of the disclosure.

According to one embodiment, an electronic device 201 (e.g. reference numeral 101 in FIG. 1) may include: a universal serial bus (USB) connector exposed through a part of a housing and including a first port (not shown); multiple second ports 230a, 230b, 230c, and 230d; a third port 270; and a control circuit 250 (e.g. the processor 120 in FIG. 1).

According to various embodiments, the electronic device 201 may include a hub device or a dongle device. The electronic device 201 may include various devices for connecting external devices or relaying data between the external devices.

According to one embodiment, the USB connector 210 may be connected to a first external device 202 of the electronic device 201 in a wired manner. For example, the USB connector 210 may be connected to an external USB host device (e.g. a notebook or a desktop computer) through a cable. According to one embodiment, the first port of the USB connector 210 may be an upstream port connected to the first external device 202 (e.g. the USB host device).

According to one embodiment, the multiple second ports 230a, 230b, 230c, and 230d may be electrically connected to the first port of the USB connector 210. According to one embodiment, the multiple second ports 230a, 230b, 230c, and 230d may be electrically connected to the control circuit 250. For example, at least some of the second ports 230a, 230b, 230c, and 230d may be formed as a connector or socket. In another example, at least some of the second ports 230a, 230b, 230c, and 230d may have a shape in which some terminals (e.g. a data terminal (D+ terminal or a D− terminal), a power supply (VBUS) terminal, or a ground (GND) terminal) electrically connected to another element (e.g. the control circuit 250) of the electronic device 201 are exposed. In another example, at least some of the second ports 230a, 230b, 230c, and 230d may be interfaces, each of which has the shape of a circuit line connected to another element (e.g. the control circuit 250). According to one embodiment, at least one of the multiple second ports 230a, 230b, 230c, and 230d may not be exposed out of the housing. FIG. 2 illustrates only four second ports 230a, 230b, 230c, and 230d. However, according to various embodiments, the electronic device may include one or more second ports, and the number of the second ports may be variously changed.

According to one embodiment, the third port 270 may provide multiple logical wireless sessions 290. According to one embodiment, the third port 270 may provide the wireless sessions 290 through a communication module (e.g. the communication module 190 in FIG. 1) of the electronic device 201. For example, the third port 270 may provide Wi-Fi wireless sessions 290. For example, the third port 270 may be wirelessly connected to at least one second external device 204a, 204b, 204c, or 204d (e.g. a Wi-Fi serial bus (WSB) device) through the wireless sessions 290. According to various embodiments, the second external device 204a, 204b, 204c, or 204d may include various accessory devices (e.g. a keyboard, a mouse, an earphone, or a wearable device). For example, the third port 270 may be wirelessly connected to the at least one second external device 204a, 204b, 204c, or 204d via a Wi-Fi interface. According to one embodiment, the third port 270 may include a wireless communication interface connected to the at least one second external device 204a, 204b, 204c, or 204d via the wireless sessions 290 in addition to a physical connector or socket. FIG. 2 illustrates wireless sessions configured for four second external device 204a, 204b, 204c, and 204d. However, according to various embodiments, the third port 270 may provide at least one wireless session, and the number of wireless sessions provided by the third port 270 is not limited to the number illustrated in FIG. 2.

According to one embodiment, the control circuit 250 may select one of the multiple second ports 230a, 230b, 230c, and 230d. According to one embodiment, the control circuit 250 may provide a communication path between the selected second port and one of the multiple logical wireless sessions 290 in order perform data communication.

For example, when a new logical wireless session 290 is configured through the third port 270, the control circuit 250 may select a second port, which is currently deactivated, from among the multiple second ports 230a, 230b, 230c, and 230d. For example, the control circuit 250 may activate the selected second port.

For example, when one of the logical wireless sessions 290 is terminated, the control circuit 250 may deselect a second port corresponding to the terminated wireless session 290. For example, the control circuit 250 may deactivate the deselected second port.

According to one embodiment, the control circuit 250 may map one of the multiple second ports 230a, 230b, 230c, and 230d to each of the multiple logical wireless sessions 290. For example, the control circuit 250 may map a different second port to each of the wireless sessions 290.

According to one embodiment, the control circuit 250 may convert data received via the selected second port into data of a format corresponding to the multiple wireless sessions 290 and may transmit the converted data to the third port 270. For example, the control circuit 250 may convert a USB-format wired packet received via the selected second port into a Wi-Fi-format wireless packet and may transmit the wireless packet to the third port 270. According to one embodiment, the control circuit 250 may convert data of a Wi-Fi-format received via the third port 270 into data of a format corresponding to the USB connector 210, and may transmit the converted data to the selected second port. For example, the control circuit 250 may convert a Wi-Fi-format wireless packet received via the third port 270 into a USB-format wired packet and may transmit the wired packet to the selected second port.

According to one embodiment, the electronic device 201 may further include a switching circuit (not shown). According to one embodiment, the switching circuit may include at least one among a signal switch circuit (signal switching IC), a multiplexer, or a serializer.

According to one embodiment, the switching circuit may select one of the second ports 230a, 230b, 230c, and 230d. According to one embodiment, the control circuit 250 may control the switching circuit to select one of the second ports 230a, 230b, 230c, and 230d.

According to one embodiment, the switching circuit may include a data signal line. According to one embodiment, the control circuit 250 may pull up the data signal line of the switching circuit in order to select one of the second ports 230a, 230b, 230c, and 230d. According to one embodiment, the control circuit 250 may pull down the data signal line of the switching circuit in order to deselect one of the second ports 230a, 230b, 230c, and 230d.

According to one embodiment, the data signal line of the switching circuit may be electrically connected to a data signal line of at least one of the multiple second ports 230a, 230b, 230c, and 230d. For example, when the data signal line of the switching circuit is pulled up, a data signal line of a second port electrically connected to the switching circuit may be pulled up. According to one embodiment, when the data signal line of the second port is pulled up, the first external device 202 (e.g. the USB host device) may recognize that a USB device (e.g. USB device unit) has been connected to the second port. For example, when the data signal line of the switching circuit is pulled down, the data signal line of the second port electrically connected to the switching circuit may be pulled down. According to one embodiment, when the data signal line of the second port is pulled down, the first external device 202 (e.g. the USB host device) may recognize that the USB device (e.g. the USB device unit), which was recognized to be connected to the second port, has been disconnected.

According to various embodiments, the electronic device 201 may form a communication path between a host device using a USB interface (e.g. the USB connector 210) and a WSB device using a Wi-Fi interface, and may relay data communication between the USB device and the WSB device.

According to one embodiment, the first external device 202 and at least one second external device 204a, 204b, 204c, or 204d, which are connected to the electronic device 201, may perform negotiation about a USB role. For example, when the first external device 202 operates as the USB host device, the second external device 204a, 204b, 204c, or 204d may operate as the USB device unit.

Figure 3:
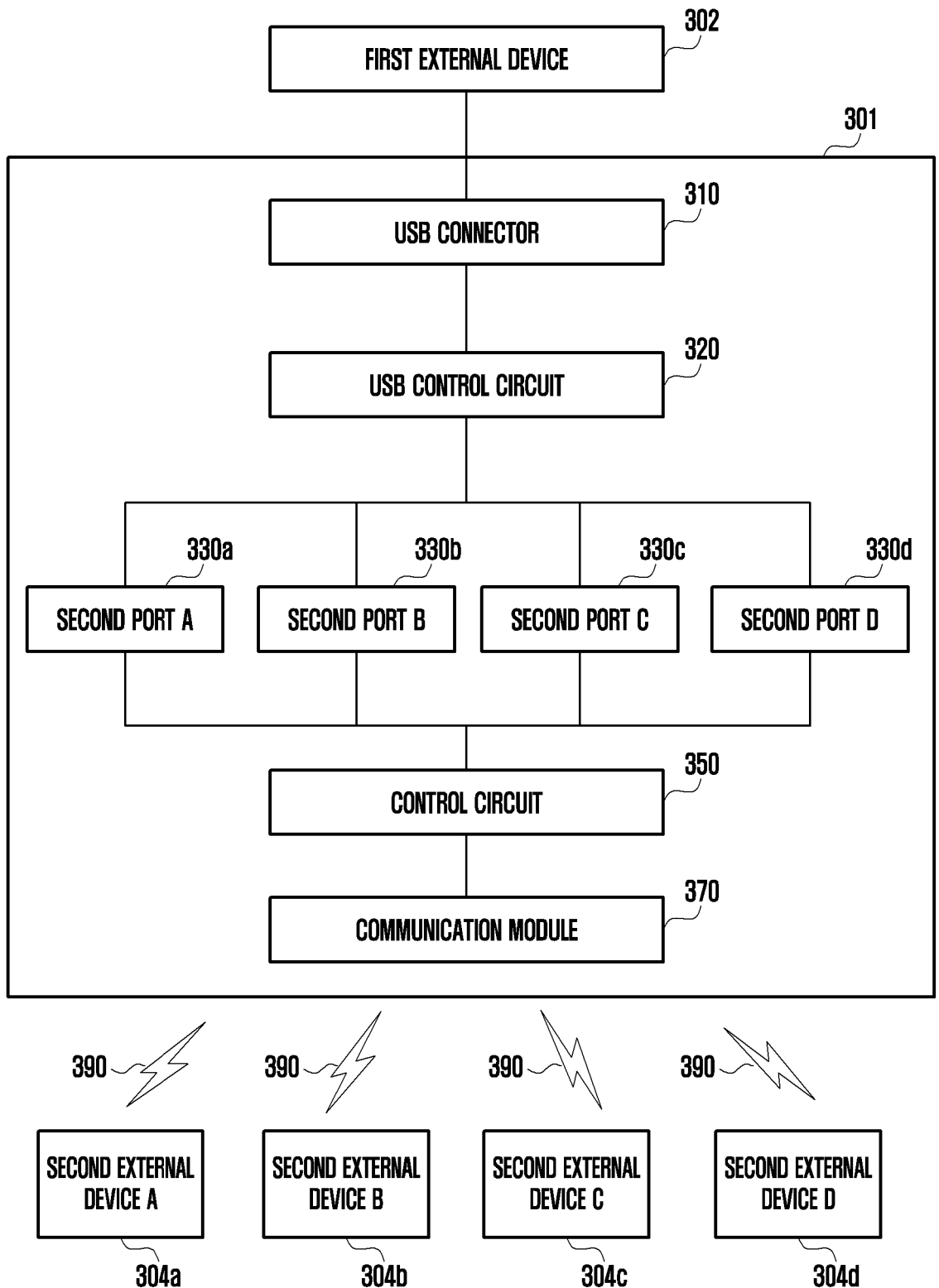
FIG. 3 is a block diagram of an electronic device according to various embodiments of the disclosure.

FIG. 3 is a block diagram of an electronic device 301 according to various embodiments of the disclosure.

According to one embodiment, the electronic device 301 (e.g. the electronic device 101 in FIG. 1) may include: a USB connector 310 including a first port (not shown); a USB control circuit 320; multiple second ports 330a, 330b, 330c, and 330d; a control circuit 350 (e.g. the processor 120 in FIG. 1); and a communication module 370 (e.g. the communication module 190 in FIG. 1).

According to one embodiment, the USB connector 310 may be connected to a first external device 302 (e.g. the USB host device) through the first port. For example, the first port may be an upstream port.

According to one embodiment, the USB control circuit 320 may be electrically connected to the first port and the multiple second ports 330a, 330b, 330c, and 330d. According to one embodiment, the USB control circuit 320 may be a module or a chip for performing a USB hub function. For example, the USB control circuit 320 may detect the active state of the second ports, and may inform the first external device 302 (e.g. the USB host device) connected to the first port of the detected active state of the second ports. For example, the USB control circuit 320 may inform the first external device 302 of whether the second ports 330a, 330b, 330c, and 330d are activated, so that the first external device 302 starts communication via a USB interface (e.g. the USB connector 310). According to one embodiment, when the USB control circuit 320 recognizes that a second external device 304a, 304b, 304c, or 304d is connected to at least one second port, the USB control circuit 320 may inform the first external device 302 of the same via the first port.

According to one embodiment, the multiple second ports 330a, 330b, 330c, and 330d may be electrically connected to the control circuit 350. For example, the second ports 330a, 330b, 330c, and 330d may have a connector or socket shape. In another example, each of the second ports 330a, 330b, 330c, and 330d has a shape in which some terminals (e.g. a data terminal (D+ terminal or D− terminal), a power supply (VBUS) terminal, or a ground (GND) terminal) electrically connected to another element (e.g. the control circuit 350) of the electronic device 301 are exposed. In another example, each of the second ports 330a, 330b, 330c, and 330d may be an interface having the shape of a circuit line connected to another element (e.g. the control circuit 350).

According to one embodiment, the control circuit 350 may be electrically connected to the communication module 370. According to one embodiment, the control circuit 350 may select one from among the multiple second ports 330a, 330b, 330c, and 330d. According to one embodiment, the control circuit 350 may pull up a data signal line of one of the multiple second ports 330a, 330b, 330c, and 330d. For example, when the data signal line of one of the second ports 330a, 330b, 330c, and 330d is pulled up, the USB control circuit 320 may recognize that the second external device 304a, 304b, 304c, or 304d is connected to the corresponding second port. According to one embodiment, the control circuit 350 may pull down a data signal line of one of the multiple second ports 330a, 330b, 330c, and 330d. For example, when the data signal line of one of the second ports 330a, 330b, 330c, and 330d is pulled down, the USB control circuit 320 may recognize that the second external device 304a, 304b, 304c, or 304d connected to the corresponding second port is disconnected.

According to one embodiment, the control circuit 350 may provide a communication path between one of multiple logical wireless sessions 390 and a selected second port in order to perform data communication.

According to one embodiment, when a new wireless session is established via the communication module 370, the control circuit 350 may select a second port, which is currently deactivated, from among the multiple second ports 330a, 330b, 330c, and 330d. For example, the control circuit 350 may activate the selected second port.

According to one embodiment, when one of the wireless sessions 390 is terminated, the control circuit 350 may deselect a second port corresponding to the terminated wireless session. For example, the control circuit 350 may deactivate the deselected second port.

According to one embodiment, the control circuit 350 may map one of the multiple second ports 330a, 330b, 330c, and 330d to each of the multiple wireless sessions. For example, the control circuit 350 may map a different second port to each of the wireless sessions.

According to one embodiment, the control circuit 350 may convert data received via a selected second port 330a, 330b, 330c, or 330d into data of a format corresponding to the multiple wireless sessions, and may transmit the data of converted format to the second external device 304a, 304b, 304c, or 304d via the communication module 370. For example, the control circuit 350 may convert a USB-format wired packet received via the second port 330a, 330b, 330c, or 330d into a Wi-Fi-format wireless packet, and may the converted data to the second external device 304a, 304b, 304c, or 304d via the communication module 370. According to one embodiment, the control circuit 350 may convert data received via the communication module 370 into data of a format corresponding to the USB connector 310, and may transmit the converted data to the second port 330a, 330b, 330c, or 330d. For example, the control circuit 350 may convert a Wi-Fi-format wireless packet received via the communication module 370 into a USB-format wired packet, and may transmit the converted data to the second port 330a, 330b, 330c, or 330d.

According to one embodiment, the communication module 370 may provide multiple wireless sessions. According to one embodiment, the communication module 370 may include a third port for providing the multiple wireless sessions.

According to one embodiment, the communication module 370 may be a Wi-Fi communication module 370 (e.g. a Wi-Fi direct module) for performing wireless communication with the second external device 304a, 304b, 304c, or 304d (e.g. a Wi-Fi serial bus (WSB) device) via a Wi-Fi interface. For example, the communication module 370 may connect communication with a device for supporting a WSB through a wireless network. For example, the communication module 370 may generate a P2P group (e.g. a Wi-Fi direct group) with the second external device 304a, 304b, 304c, or 304d, and may establish a wireless connection between a group owner terminal of the generated P2P group and a group client terminal. For example, the communication module 370 may wirelessly connect the second external device 304a, 304b, 304c, or 304d as a client terminal. According to one embodiment, the communication module 370 may include a tunneled direct link setup (TDLS) module configured to establish a direct link between devices for supporting a WSB.

Figure 4:
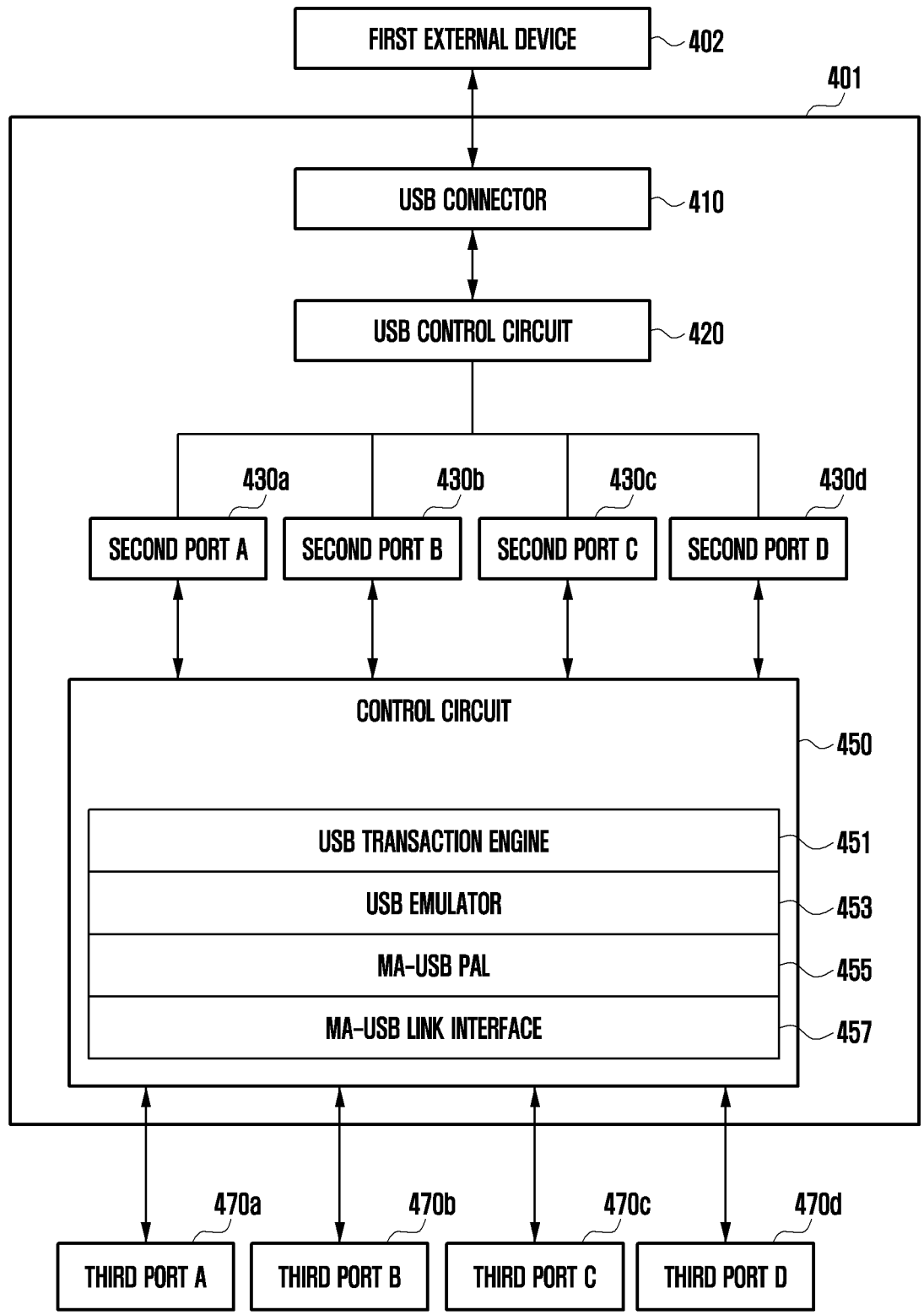
FIG. 4 is a block diagram of an electronic device according to various embodiments of the disclosure.

FIG. 4 is a block diagram of an electronic device according to various embodiments of the disclosure.

According to one embodiment, the electronic device 401 (e.g. the electronic device 101 in FIG. 1) may include: a USB connector 410 including a first port (not shown); a USB control circuit 420; multiple second ports 430a, 430b, 430c, and 430d; and a control circuit 450.

According to one embodiment, the USB connector 410 may be connected to a first external device 402 (e.g. the USB host device). For example, the USB connector 410 may be connected to the first external device 402 in a wired manner.

According to one embodiment, the USB control circuit 420 may be electrically connected to the first port and the multiple second ports 430a, 430b, 430c, and 430d. According to one embodiment, the USB control circuit 420 may be a module or a chip for performing a USB hub function. For example, the USB control circuit 420 may detect the active state of at least one second port 430a, 430b, 430c, or 430d, and may inform the first external device 402 (e.g. the USB host device) connected to the first port of the detected active state of the at least one second port. For example, the USB control circuit 420 may inform the first external device 402 of whether the second port is activated, so that the first external device 402 starts communication via a USB interface (e.g. the USB connector 410). According to one embodiment, when the USB control circuit 420 recognizes that a second external device is connected to the second port 430a, 430b, 430c, or 430d, the USB control circuit 420 may inform the first external device 402 of the recognition via the first port.

According to one embodiment, the multiple second ports 430a, 430b, 430c, and 430d may be electrically connected to the control circuit 450.

According to one embodiment, the control circuit 450 may provide a communication path between the multiple second ports 430a, 430b, 430c, and 430d and third ports 470a, 470b, 470c, and 470d (e.g. wireless sessions).

According to one embodiment, the control circuit 450 may include: a USB transaction engine module 451; a USB emulator module 453; an MA USB physical abstraction layer (MA USB PAL) module 455; and an MA USB link interface module 457.

According to one embodiment, the USB transaction engine module 451 may interconvert a USB packet and an MA USB packet. According to one embodiment, the USB transaction engine module 451 may map, to an MA-USB packet, a physical USB signal (e.g. the state of data signal lines (D+, D−) such as a suspended state or a resumed state) transmitted or received by the second port 430a, 430b, 430c, or 430d. According to one embodiment, the control circuit 450 (e.g. the USB emulator module 453 or the USB transaction engine module 451) may monitor the suspended or resumed state of a data signal line of the second port. For example, when data transmitted or received via a data signal line does not exist for a long time, the USB transaction engine module 451 may determine the state of the second port to be a suspended state. Further, when there are data in the data signal line, the USB transaction engine module 451 may determine the state of the second port to be a resumed state. According to one embodiment, the control circuit 450 (e.g. the USB emulator module 453 or the USB transaction engine module 451) may map the monitored state of the data signal line to an MA-USB packet and may transmit the same to a WSB device.

According to one embodiment, the USB transaction engine module 451 may perform a USB transaction (e.g. a setup transaction, an IN transaction, or an OUT transaction) of the first external device 402 (e.g. the USB host device). When a USB transaction occurs, the control circuit 450 (e.g. the USB transaction engine module 451) may convert the USB transaction into an MA USB transaction. For example, the USB transaction engine module 451 may perform wireless data transmission/reception (wireless transaction transmission/reception) via a WSB.

According to one embodiment, the USB emulator module 453 may include an MA USB host and a hub emulator.

According to one embodiment, the MA USB host may implement session setup and session termination. For example, when a WSB session with the second external device (e.g. an external WSB device) is set up/terminated, a WSB service module may transmit information on the setup/termination of the WSB session to the USB emulator module 453, and the USB emulator module 453 (e.g. an MA USB host) may set up/terminate an MA-USB session in conjunction with the set-up/terminated WSB session. For example, when an MA-USB session is newly set up, the USB emulator module 453 (e.g. the MA USB host) may select an unused second port from among the multiple second ports, and may perform control such that a data signal line (D+ line) of the selected second port is pulled up. For example, when the data signal line of the second port is pulled up, the first external device 402 (e.g. the USB host device) may recognize that an external USB device has been connected in the wired manner. For example, when a WSB session connection to the second external device (e.g. the WSB device) is terminated, the USB emulator module 453 (e.g. the MA USB host) may perform control such that a data signal line (D+ line) of a second port corresponding to the terminated session connection is pulled down. For example, when the data signal line of the second port is pulled down, the first external device 402 (e.g. the USB host device) may recognize that the connected external USB device has been disconnected.

According to one embodiment, when the first external device 402 (e.g. the USB host device) is disconnected from the electronic device 401 (e.g., the USB connector 410), the USB emulator module 453 (e.g. the MA USB host) may perform control such that a WSB session (or an MA-USB session) mapped to a disconnected second ports 430*a*, 430*b*, 430*c*, or 430*d* is terminated (disconnected).

According to one embodiment, the USB emulator module 453 (e.g. the hub emulator) may emulate a physical USB hub port as an MA-USB hub port by using a transaction translator. For example, the USB emulator (e.g. the hub emulator) may perform address mapping, USB physical signal mapping, USB physical host request mapping to MA-USB host request, etc.

Address mapping: For example, the first external device 402 (e.g. the USB host device) assigns USB addresses 0-127 to USB devices during USB enumeration. According to one embodiment, the hub emulator may assign (map) the USB addresses 1-127 to second external devices (e.g. WSB devices) connected to a WSB session. For example, the hub emulator may assign (map) a USB address assigned from the first external device 402 (e.g. the USB host device) to a WSB session.

USB physical signal mapping: According to one embodiment, the hub emulator may use the USB transaction engine module 451 to map physical USB signals (e.g. the state of data signal lines (D+, D−) such as a suspend state or a resumed state), transmitted or received from the second ports 430*a*, 430*b*, 430*c*, or 430*d*, to an MA-USB packet.

USB physical host request mapping to MA-USB host request: According to one embodiment, the hub emulator may transmit a USB transaction requested by the first external device 402 (e.g. the USB host device) to the second external device (e.g. the WSB device) through an MA-USB session by using the USB transaction engine module 451.

According to one embodiment, the MA USB PAL module 455 may interconvert a packet independent of MA USB media and a packet specializing in the media. For example, the MA USB PAL module 455 may interconvert an MA USB packet and a WSB packet.

TABLE 1

| Second port | USB address | MA USB session (WSB session) Destination IP |
|---|---|---|
| a | 1 | Address of first WSB device |
| b | 2 | Address of second WSB device |
| c | 3 | Address of third WSB device |

For example, when USB addresses 1 to 3 are mapped to WSB devices, respectively, as shown in Table 1, The MA USB PAL module 455 may convert a USB packet, received from the first external device 402 (e.g. the USB host device) to an address device 1, into a WSB packet to be transmitted to a first WSB device (e.g. TCP/IP packetizing), and may transmit the WSB packet to the first WSB device. For example, the MA USB PAL module 455 may convert a WSB packet received from the first WSB device into a USB packet (e.g. TCP/IP packetizing and USB packetizing into USB address 1) and may transmit the USB packet to the USB connector 410 (e.g. the first port).

According to one embodiment, the MA USB link interface module 457 may connect the multiple third ports 470*a*, 470*b*, 470*c*, and 470*d* to a link. According to one embodiment, each of the multiple third ports 470*a*, 470*b*, 470*c*, and 470*d* may include a link channel (a wireless session) for communicating with the second external device (e.g. the WSB device). According to one embodiment, the MA USB link interface module 457 may transmit an MA USB packet to the second external device through the third port 470*a*, 470*b*, 470*c*, or 470*d*.

According to one embodiment, the MA USB link interface module 457 may transmit or receive a WSB packet through Wi-Fi. For example, the MA USB link interface module 457 may transmit or receive packetized data through a WSB session.

According to various embodiments, each of the USB transaction engine module 451, the USB emulator module 453, the MA USB PAL module 455, and the MA USB link interface module 457 may be implemented as a separate physical circuit or chip, or may be implemented in software in the control circuit 450.

Figure 5:
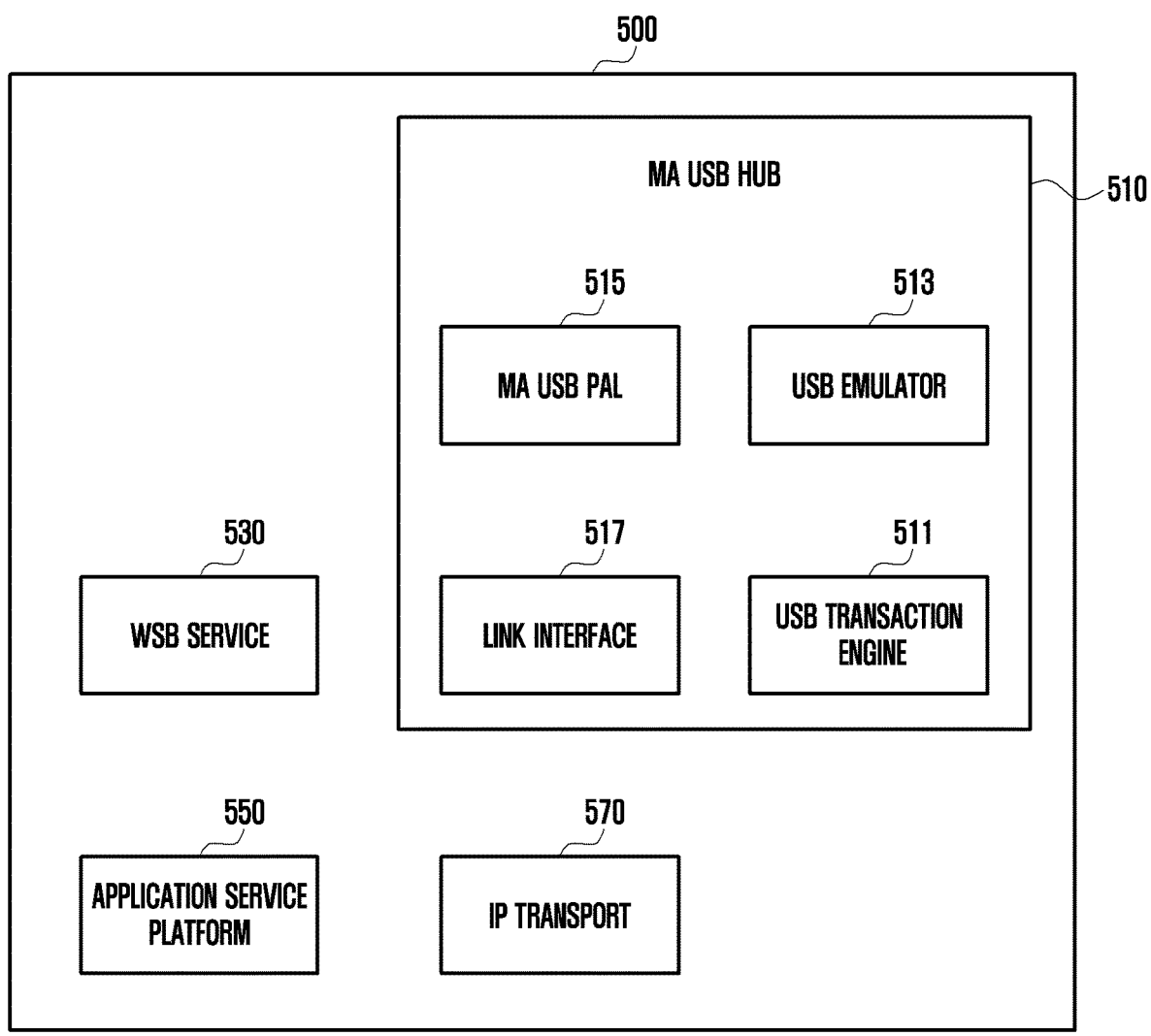
FIG. 5 is a software block diagram of a control circuit of an electronic device according to various embodiments of the disclosure.

FIG. 5 is a software block diagram of a control circuit of an electronic device according to various embodiments of the disclosure.

According to one embodiment, a control circuit 500 (e.g. the control circuit 450) of the electronic device may include a media agnostic USB (MA USB) hub module 510, a WSB service module 530, an application service platform (ASP) module 550, and an IP transport module 570.

According to one embodiment, the MA USB hub module 510 may include a USB transaction engine module 511, a USB emulator module 513, an MA USB physical abstraction layer (MA USB PAL) module 515, and a link interface module 517.

According to one embodiment, the USB transaction engine module 511 may interconvert a USB packet and an MA USB packet. According to one embodiment, the USB transaction engine module 511 may map physical USB signals (e.g. the state of data signal lines (D+, D−) such as a suspended state or a resumed state), transmitted or received from a first port, to an MA-USB packet. For example, the USB transaction engine module 511 may map USB signals, transmitted or received from an external device (e.g. a USB host device) via a first port (not shown) of a USB connector of the electronic device, to an MA-USB packet. According to one embodiment, the USB transaction engine module 511 may monitor the suspended or resumed state of a data signal line of the first port. For example, when data transmitted or received via a data signal line does not exist for a long time, the USB transaction engine module 511 may determine the state of the first port to be a suspended state. Further, when there are data in the data signal line, the USB transaction engine module 511 may determine the state of the first port to be a resumed state. According to one embodiment, the USB transaction engine module 511 may map the monitored state of the data signal line to an MA-USB packet and may transmit the MA-USB packet to a WSB device.

According to one embodiment, the USB transaction engine module 511 may perform a USB transaction (e.g. a setup transaction, an IN transaction, an OUT transaction) of the first external device 402 (e.g. the USB host device). According to one embodiment, when a USB transaction occurs, the USB transaction engine module 511 may convert the USB transaction into an MA USB transaction. For example, the USB transaction engine module 511 may perform wireless data transmission/reception (wireless transaction transmission/reception) via a WSB.

According to one embodiment, when an MA-USB session is newly set up, the USB emulator module 513 may select an unused second port from among the multiple second ports 430a, 430b, 430c, and 430d, and may perform control such that a data signal line (D+ line) of the selected second port is pulled up. For example, when the data signal line of the second port is pulled up, the first external device (e.g. a USB host device) may recognize that an external USB device has been connected in the wired manner. For example, when a WSB session connection to the second external device (e.g. the WSB device) is terminated, the USB emulator module 513 (e.g. an MA USB host) may perform control such that a data signal line (D+ line) of a second port corresponding to the terminated session connection is pulled down. For example, when the data signal line of the second port is pulled down, the first external device (e.g. the USB host device) may recognize that the connected external USB device has been disconnected.

According to one embodiment, when the first external device (e.g. the USB host device) is disconnected from the electronic device, the USB emulator module 513 may perform control such that a WSB session (or an MA-USB session) corresponding to the disconnection is terminated (disconnected).

According to one embodiment, the USB emulator module 513 may perform address mapping, USB physical signal mapping, USB physical host request mapping to MA-USB host request, etc.

According to one embodiment, the MA USB PAL module 515 may interconvert a packet independent of MA USB media and a packet specializing in the media. For example, the MA USB PAL module 515 may interconvert an MA USB packet and a WSB packet.

According to one embodiment, the link interface module 517 may generate a link channel (a wireless session) for communicating with at least one second external device (e.g. a WSB device or an MA USB device). According to one embodiment, the link interface module 517 may transmit an MA USB packet to the second external device through the third port 470a, 470b, 470c, or 470d.

According to one embodiment, the link interface module 517 may transmit or receive a WSB packet through Wi-Fi. For example, the link interface module 517 may include an MA USB link interface module. For example, the link interface module 517 may transmit or receive packetized data in a WSB session.

According to one embodiment, the WSB service module 530 may perform the service discovery and connection setup of a WSB service. According to one embodiment, the WSB service module 530 may interact with the ASP module 550 at the top of the ASP module 550. According to one embodiment, the WSB service module 530 may exchange events and primitive for service discovery and connection setup with the ASP module 550 through a communication path. According to one embodiment, the WSB service module 530 may designate the protocol mode of an MA USB protocol during the WSB session of each WSB service.

According to one embodiment, the WSB service module 530 may connect external electronic devices (e.g. WSB device units) to a WSB session via ASP and Wi-Fi direct. According to one embodiment, the WSB service module 530 may transmit connection information for the wireless session to the link interface module 517 so that the link interface module 517 can use the connection information as a communication channel using an MA-USB. For example, the connection information for the session may include information related to a WSB session, such as an IP address, a port number, or a WSB session open/close information. For example, the WSB service module 530 may transmit the IP (Wi-Fi session IP) address of the WSB device to the MA USB hub module 510, or may transmit an abstract IP address to the MA USB hub module 510. According to one embodiment, when new session setup information is received in the MA link interface module 517, the WSB service module 530 may inform the USB emulator module 513 of the new session setup information.

According to one embodiment, the ASP module 550 may implement common functions used by applications and services operated through a Wi-Fi direct module or other wireless connections.

According to one embodiment, the IP transport module 570 may exchange data with an external device by using an internet protocol (IP). For example, the IP transport module 570 may transmit USB data via the IP.

Figure 6:
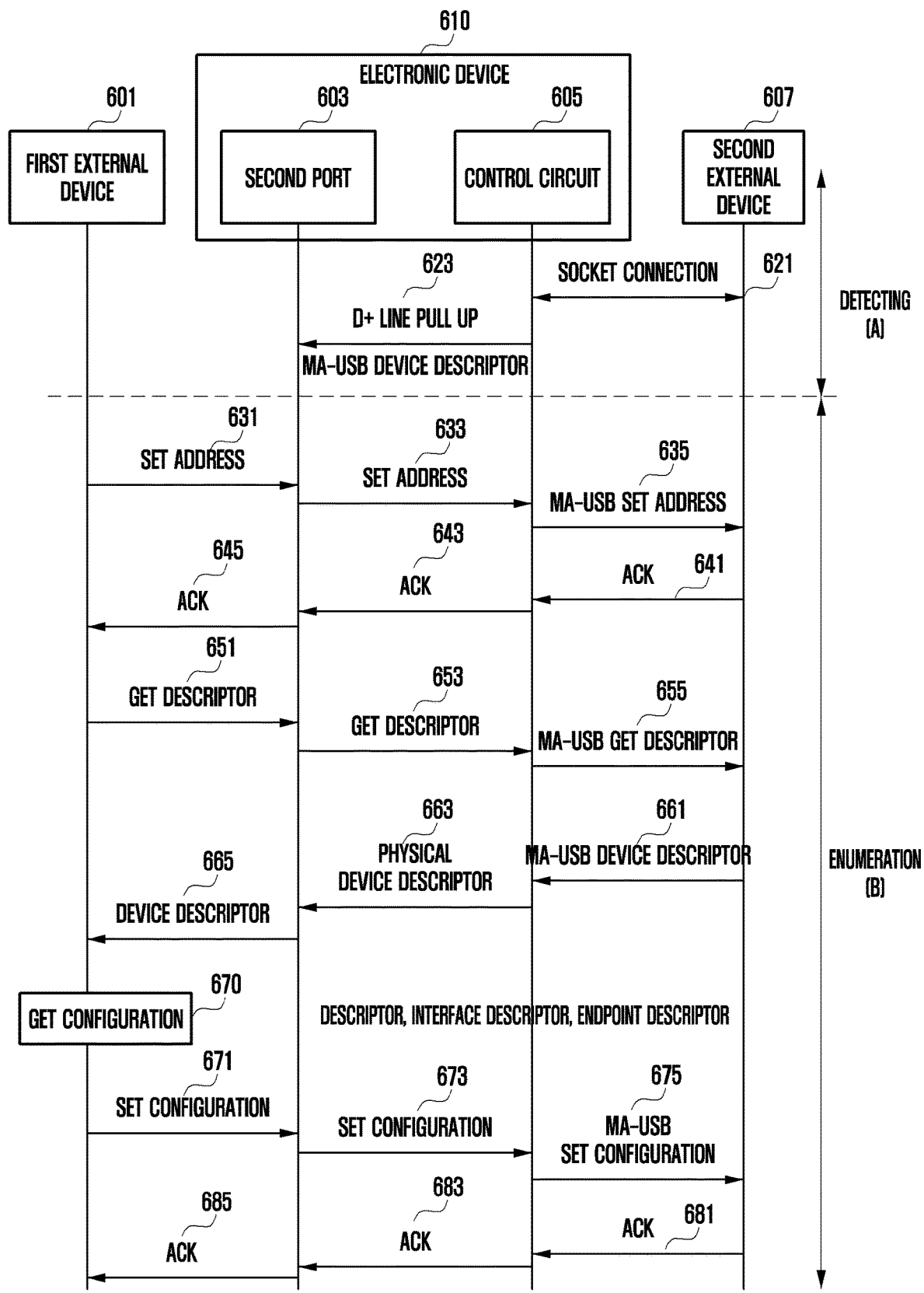
FIG. 6 is a flowchart of operation of an electronic device according to various embodiments of the disclosure.

FIG. 6 is a flowchart of operation of an electronic device according to various embodiments of the disclosure.

According to one embodiment, an electronic device 610 (e.g. the electronic device 101) may include a USB connector (not shown) including a first port (not shown), multiple second ports 603, and a control circuit 605. According to one embodiment, the electronic device 610 may form a communication path between a first external device 601 (e.g. a USB device) and a second external device 607 (e.g. a WSB device or an MA-USB device) through a detection operation (A) and an enumeration operation (B) so as to relay data therebetween. For example, the electronic device 610 may be connected to the first external device 601 via the first port in a wired manner, and may be connected to the second external device 607 via a third port (e.g. a wireless session).

According to one embodiment, in operation 621, the control circuit 605 may detect that the second external device 607 is connected. For example, the control circuit 605 may form a wireless session with the second external device 607 through Wi-Fi.

According to one embodiment, in operation 623, the control circuit 605 may pull up a data signal line of each of the second ports 603. According to one embodiment, the control circuit 605 may select one second port, to which a wireless session is to be connected, from among the multiple second ports 603. The control circuit 605 may pull up the data signal line of the selected second port 603. According to one embodiment, the electronic device 610 may pull up the data signal line of the second port 603 to inform the first external device 601 that the second external device 607 is connected to the second port 603 through the first port of the USB connector. For example, when the data signal line of the second port 603 is pulled up, the first external device 601 (e.g. a USB host device) may determine that a USB device is connected to the second port 603 of the electronic device 610.

According to one embodiment, in operation 631, the first external device 601 may transmit an address setting packet (a set address) to the second port 603 via the USB connector (e.g. the first port) (not shown). According to one embodiment, in operation 633, the second port 603 may transmit the received address setting packet (the set address) to the control circuit 605. According to one embodiment, in operation 635, the control circuit 605 may convert the received address setting packet (the set address) into a format corresponding to a wireless session. For example, the control circuit 605 may convert an address setting packet (a set address) into an MA-USB-format address setting packet (an MA-USB set address) and may transmit the MA-USB-format address setting packet (the MA-USB set address) to the second external device 607.

According to one embodiment, in operation 641, the second external device 607 may transmit an acknowledgment packet (ack) to the electronic device 610 (e.g. the control circuit 605). According to one embodiment, in operation 643, the control circuit 605 may transmit the received acknowledgment packet (ack) to the second port 603. In operation 645, the electronic device 610 may transmit the acknowledgment packet (ack) received via the second port 603 to the first external device 601. For example, through the USB connector (e.g. the first port (not shown)) of the electronic device, the electronic device may transmit the acknowledgment packet (ack) received via the second port 603 to the first external device connected to the USB connector.

According to one embodiment, in operation 651, the first external device 601 may transmit a descriptor request packet (get descriptor) to the electronic device 610 (e.g. the second port 603). For example, the first external device 601 may transmit a descriptor request packet (get descriptor) to the second port 603 via the USB connector (e.g. the first port). In operation 653, the second port 603 may transmit the received descriptor request packet (get descriptor) to the control circuit 605. In operation 655, the electronic device 610 (e.g. the control circuit 605) may convert the descriptor request packet (get descriptor) into an MA-USB-format descriptor request packet (MA-USB get descriptor) and may transmit the MA-USB-format descriptor request packet (MA-USB get descriptor) to the second external device 607. For example, the electronic device 610 may transmit the converted descriptor request packet (MA-USB get descriptor) to the second external device 607 via the USB connector (e.g. the first port).

According to one embodiment, in operation 661, the second external device 607, in response to the received MA-USB-format descriptor request packet (MA-USB get descriptor), may transmit an MA-USB-format device descriptor packet (MA-USB device descriptor) to the electronic device 610 (e.g. the control circuit 605). In operation 663, the control circuit 605 may convert the MA-USB-format device descriptor packet to a USB-format device descriptor packet (device descriptor or physical device descriptor) and may transmit the USB-format device descriptor packet to the second port 603. In operation 665, the electronic device 610 (e.g. the second port 603) may transmit a device descriptor packet (device descriptor) to the first external device 601.

According to one embodiment, in operation 670, the first external device 601 may obtain a configuration descriptor, an interface descriptor, and an endpoint descriptor through the received descriptor packet.

According to one embodiment, in operation 671, the first external device 601 may transmit a configuration setting packet (set configuration) to the electronic device 610 (e.g. the second port 603). For example, the first external device 601 may transmit a configuration setting packet (set configuration) to the second port 603 via the USB connector (e.g. the first port). In operation 673, the second port 603 may transmit the received configuration setting packet (set configuration) to the control circuit 605. In operation 675, the electronic device 610 (e.g. the control circuit 605) may convert the configuration setting packet (set configuration) into an MA-USB-format configuration setting packet (MA USB set configuration) and may transmit the MA-USB-format configuration setting packet (MA USB set configuration) to the second external device 607.

According to one embodiment, in operation 681, the second external device 607 may transmit an acknowledgment packet (ack) to the electronic device 610 (e.g. the control circuit 605) in response to the received MA-USB-format configuration setting packet (MA USB set configuration). According to one embodiment, in operation 683, the control circuit 605 may transmit the received acknowledgment packet (ack) to the second port 603. In operation 685, the electronic device 610 may transmit the acknowledgment packet (ack) to the first external device 601 via the second port 603. For example, the electronic device may transmit an acknowledgment packet (ack) to the first external device via the USB connector (e.g. the first port).

For example, when the first external device 601 receives an MA-USB-format configuration setting packet (MA USB set configuration) and transmits an acknowledgment packet (ack), the enumeration operation (B) may end.

According to one embodiment, through the detection operation (A) and the enumeration operation (B), the electronic device 610 may provide a communication path between the first external device 601 (e.g. the USB device) and a third external device (e.g. a WSB device or an MA-USB device) so as to relay data communication between the first external device 601 and the third external device.

Figure 7:
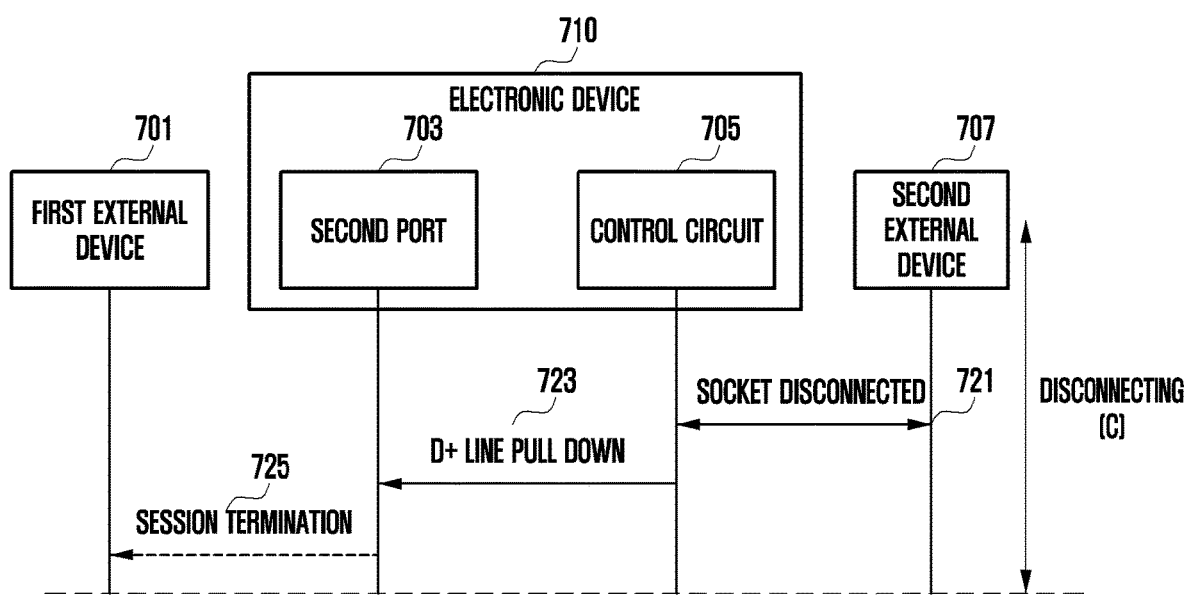
FIG. 7 is a flowchart of operation of an electronic device according to various embodiments of the disclosure.

FIG. 7 is a flowchart of operation of an electronic device according to various embodiments of the disclosure.

According to one embodiment, the electronic device may block a communication path between a first external device and a second external device through disconnecting (C).

According to one embodiment, in operation 721, a control circuit 705 may detect that a second external device 707 is disconnected. For example, the control circuit 705 may recognize that a wireless session with the second external device 707 has been terminated.

According to one embodiment, in operation 723, the control circuit 705 may pull down a data signal line of a second port 703. For example, the control circuit 705 may pull down the data signal line of a second port 703 corresponding to the terminated (i.e. disconnected) wireless session among multiple second ports 703. For example, the control circuit 705 may deselect the selected second port 703 by pulling down the data signal line of the selected second port 703.

According to one embodiment, in operation 725, by pulling down the data signal line of the second port 703, an electronic device 710 may inform a first external device 701 that a wireless session with the second external device 707 has been terminated, via a first port (not shown) of a USB connector (not shown) of the electronic device. For example, when the data signal line of the second port 703 is pulled-down, the first external device 701 (a USB host device) may determine that a USB device is disconnected from the second port 703.

An electronic device (e.g. the electronic device 201 in FIG. 2) according to various embodiments of the disclosure may include: a housing; a universal serial bus (USB) (e.g. the USB connector 210 in FIG. 2) connector exposed through a portion of the housing and including a first port; multiple second ports (e.g. the second ports 230*a*, 230*b*, 230*c*, and 230*d* in FIG. 2) electrically connected to the first port; a third port (e.g. the third port 270 in FIG. 2) configured to provide multiple logical wireless sessions 390; and a control circuit (e.g. the control circuit 250 in FIG. 2) electrically connected to the multiple second ports and the third port. The control circuit may select one of the multiple second ports and may provide a communication path between the selected second port and one of the multiple logical wireless sessions 390 in order to perform data communication.

According to one embodiment, an electronic device (e.g. the electronic device 201 in FIG. 2) may further include at least one switching circuit for selecting one of the second ports (e.g. the second ports 230*a*, 230*b*, 230*c*, and 230*d* in FIG. 2). According to one embodiment, the at least one switching circuit may be controlled by the control circuit.

According to one embodiment, at least one of the multiple second ports (e.g. the second ports 230*a*, 230*b*, 230*c*, and 230*d* in FIG. 2) may not be exposed out of the housing.

According to one embodiment, the at least one switching circuit may include a data signal line. According to one embodiment, the control circuit may pull up the data signal line of the switching circuit to select one of the second ports (e.g. the second ports 230*a*, 230*b*, 230*c*, and 230*d* in FIG. 2).

According to one embodiment, the control circuit (e.g. the control circuit 250 in FIG. 2) may pull down the data signal line of the switching circuit to deselect one of the second ports (e.g. the second ports 230*a*, 230*b*, 230*c*, and 230*d* in FIG. 2), thereby blocking the communication path.

According to one embodiment, the multiple second ports (e.g. the second ports 230*a*, 230*b*, 230*c*, and 230*d* in FIG. 2) may include data signal lines. For example, each of the multiple second ports may include a data signal line. According to one embodiment, the control circuit (e.g. the control circuit 250 in FIG. 2) may pull up one of the data signal line of one of the second ports to select the one of the second ports.

According to one embodiment, in order to deselect one of the second ports (e.g. the second ports 230*a*, 230*b*, 230*c*, and 230*d* in FIG. 2), the control circuit (e.g. the control circuit 250 in FIG. 2) may pull down the data signal line of the one of the second ports.

According to one embodiment, when a new logical wireless session is established, the control circuit (e.g. the control circuit 250 in FIG. 2) may select a second port, which is currently inactive, from among the multiple second ports (e.g. the second ports 230*a*, 230*b*, 230*c*, and 230*d* in FIG. 2).

According to one embodiment, when one of the multiple logical wireless sessions is terminated, the control circuit (e.g. the control circuit 250 in FIG. 2) may deselect a second port corresponding to the terminated wireless session.

According to one embodiment, the control circuit (e.g. the control circuit 250 in FIG. 2) may convert data received via the selected second port into a format corresponding to the multiple wireless sessions and may transmit the converted data into a format corresponding to the USB connector (e.g. the USB connector 210 in FIG. 2) and may transmit the converted data to the third port (e.g. the third port 270 in FIG. 2). Further, the control circuit may convert data received via the third port into a format corresponding to the USB connector (e.g. the USB connector 210 in FIG. 2) and may transmit the converted data to the second port.

According to one embodiment, the control circuit (e.g. the control circuit 250 in FIG. 2) may map one of the multiple second ports (e.g. the second ports 230*a*, 230*b*, 230*c*, and 230*d* in FIG. 2) to each of the multiple logical wireless sessions 390.

Figure 8:
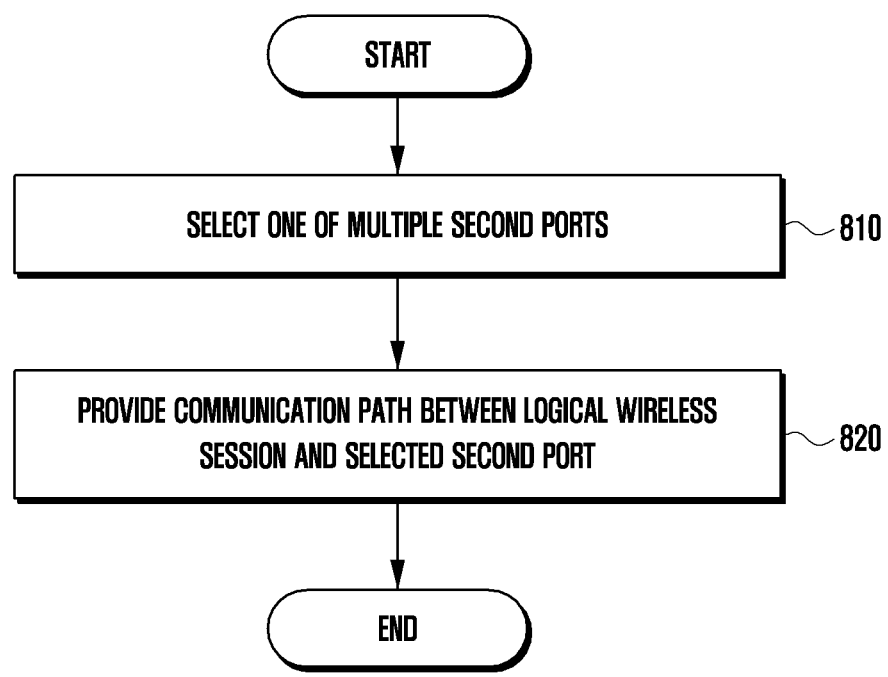
FIG. 8 is a flowchart of an operation method of an electronic device according to various embodiments of the disclosure.

FIG. 8 is a flowchart of an operation method of an electronic device according to various embodiments of the disclosure.

An electronic device (e.g. the electronic device 201) according to various embodiments of the disclosure may include a USB connector 210 including a first port, multiple second ports 230*a*, 230*b*, 230*c*, and 230*d*, and a third port 270 which provides multiple logical wireless sessions 390 or 290.

According to one embodiment, the first port may be connected to a first external device (e.g. a USB host device) 202 in a wired manner. According to one embodiment, the third port 270 may provide a wireless session through a communication module (e.g. the communication module 190 in FIG. 1) of the electronic device. For example, the third port 270 may provide Wi-Fi wireless sessions 290. For example, the third port 270 may be wirelessly connected to at least one second external device (e.g. a Wi-Fi serial bus (WSB) device) 204*a*, 204*b*, 204*c*, or 204*d*.

According to one embodiment, in operation 810, the electronic device 201 may select one of the multiple second ports 230*a*, 230*b*, 230*c* or 230*d*. According to one embodiment, when a new logical wireless session 290 is established through the third port 270, the electronic device may select a second port 230*a*, 230*b*, 230*c* or 230*d*, which is current inactive, from among the multiple second ports 230*a*, 230*b*, 230c or 230d. For example, the electronic device 201 may activate the selected second port 230a, 230b, 230c or 230d.

According to one embodiment, when one of the logical wireless sessions 290 is terminated, the electronic device 201 may deselect the second port 230a, 230b, 230c or 230d corresponding to the terminated wireless session 290. For example, the electronic device 201 may deactivate the deselected second port 230a, 230b, 230c or 230d.

According to one embodiment, the electronic device 201 may select one of the second ports 230a, 230b, 230c or 230d by using a switching circuit. According to one embodiment, the switching circuit may include a data signal line. According to one embodiment, the electronic device 201 may pull up the data signal line of the switching circuit to select one of the second ports 230a, 230b, 230c or 230d. According to one embodiment, the electronic device 201 may pull down the data signal line of the switching circuit to deselect one of the second ports 230a, 230b, 230c or 230d.

According to one embodiment, in operation 820, the electronic device 201 may provide a communication path between one of the multiple logical wireless sessions 390 or 290 and the selected second port 230a, 230b, 230c or 230d in order to perform data communication.

According to one embodiment, the electronic device may map one of the multiple second ports 230a, 230b, 230c, or 230d to each of the multiple logical wireless sessions 390 or 290. For example, the electronic device 201 may map a different second port 230a, 230b, 230c or 230d to each of the wireless sessions.

According to one embodiment, the electronic device 201 may convert data (e.g. a USB-format wired packet) received via the selected second port 230a, 230b, 230c or 230d to data (e.g. a Wi-Fi-format wireless packet) of a format corresponding to the multiple wireless sessions 290, and may transmit the converted data to the third port 270. According to one embodiment, the electronic device 201 may convert data (e.g., a Wi-Fi-format wireless packet) received via the third port 270 to data of a format corresponding to the USB connector 210 (e.g. a USB-format wired packet), and may transmit the converted data to the second port 230a, 230b, 230c, or 230d.

According to various embodiments of the disclosure an operation method of an electronic device (e.g. the electronic device 201 in FIG. 2), which includes a USB connector (e.g. the USB connector 210 in FIG. 2) including a first port, multiple second ports (e.g. second ports 230a, 230b, 230c, and 230d in FIG. 2) electrically coupled to the first port, and a third port (e.g. the third port 270 in FIG. 2) for providing multiple logical wireless sessions 390, may include: selecting one of the multiple second ports; and providing a communication path between one of the multiple logical wireless sessions 390 and the selected second port in order to perform data communication.

According to one embodiment, the selecting of one of the multiple second ports may include pulling up a data signal line of a switching circuit for selecting one of the multiple second ports.

According to one embodiment, the method may further include pulling down the data signal line to deselect one of the second ports so as to block the communication path.

According to one embodiment, the selecting of one of the multiple second ports may include selecting, when a new logical wireless session is established, a second port that is currently inactive among the multiple second ports.

According to one embodiment, the method may further include, when one of the multiple logical wireless sessions is terminated, deselecting a second port corresponding to the terminated wireless session.

According to one embodiment, the method may further include: converting data received via the selected second port into a format corresponding to the multiple wireless sessions and transmitting the converted data to the third port; converting data received via the third port into a format corresponding to the USB connector and transmitting the converted data to the second port.

According to one embodiment, in the method, each of the multiple logical wireless sessions 390 may be mapped to one of the multiple second ports.

According to one embodiment, the method may include pulling up a data signal line of one of the second ports so as to select the one of the multiple ports.

According to one embodiment, the method may further include pulling down one of a data signal line of one of the second ports so as to deselect the one of the second ports.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a housing;
a universal serial bus (USB) connector exposed through a portion of the housing and comprising a first port for connection to a first external device;
multiple second ports electrically connected to the first port;
a communication circuitry configured to provide at least one wireless session; and
a control circuit electrically connected to the multiple second ports and the communication circuitry, the control circuit being configured to:
select a second port in an inactive state from among the multiple second ports based on the establishment of a new wireless session with a second external device through the communication circuitry,
activate the selected second port,
provide a communication path between the activated second port and the new wireless session in order to perform data communication,
convert data received via the activated second port into a first format corresponding to the new wireless session, and
transmit the first format converted data to the communication circuitry, the first format being a format other than a USB format.

2. The electronic device of claim 1, further comprising at least one switching circuit configured to select one of the second ports,
wherein the at least one switching circuit is controlled by the control circuit.

3. The electronic device of claim 2, wherein the at least one of the multiple second ports is not exposed out of the housing.

4. The electronic device of claim 2,
wherein the at least one switching circuit comprises a data signal line, and
wherein the control circuit is further configured to pull up the data signal line of the at least one switching circuit so as to select one of the second ports.

5. The electronic device of claim 4, wherein the control circuit is further configured to pull down the data signal line of the at least one switching circuit to deselect one of the second ports so as to block the communication path.

6. The electronic device of claim 1,
wherein each of the multiple second ports comprises a data signal line, and
wherein the control circuit is further configured to pull up a data signal line of one of the second ports to select the one of the second ports.

7. The electronic device of claim 6, wherein the control circuit is further configured to pull down a data signal line of one of the second ports to deselect the one of the second ports.

8. The electronic device of claim 1, wherein, when one of the at least one wireless session is terminated, the control circuit is further configured to deselect a second port corresponding to the terminated wireless session.

9. The electronic device of claim 1,
wherein the control circuit is further configured to:
convert data received via the communication circuitry into a second format corresponding to the USB connector, and
transmit the second format converted data to the activated second port.

10. The electronic device of claim 1, wherein the control circuit is further configured to map one of the multiple second ports to one of the at least one wireless session.

11. An operation method of an electronic device comprising a USB connector comprising a first port for connection to a first external device, multiple second ports electrically connected to the first port, and a communication circuitry configured to provide at least one wireless session, the operation method comprising:
selecting a second port in an inactive state from among the multiple second ports based on the establishment of a new wireless session with a second external device through the communication circuitry;

activating the selected second port;

providing a communication path between the activated second port and the new wireless session in order to perform data communication;

converting data received via the activated second port into a first format corresponding to the new wireless session; and transmitting the first format converted data to the communication circuitry, the first format being a format other than a USB format.

12. The operation method of claim 11, wherein the selecting of the second port comprises:

pulling up a data signal line of a switching circuit configured to select the one of the multiple second ports.

13. The operation method of claim 12, further comprising:

pulling down the data signal line of the switching circuit to deselect one of the second ports so as to block the communication path.

14. The operation method of claim 11, further comprising:

deselecting, when one of the at least one wireless session is terminated, a second port corresponding to the terminated wireless session.

15. The operation method of claim 11, further comprising:

converting data received via the communication circuitry into a second format corresponding to the USB connector; and transmitting the second format converted data to the activated second port.

16. The operation method of claim 11, wherein one of the at least one wireless session is mapped to one of the multiple second ports.

17. The operation method of claim 11, wherein the selecting of the second port comprises:

pulling up a data signal line of the one of the second ports to select the one of the second ports.

18. The operation method of claim 17, further comprising:

pulling down a data signal line of one of the second ports to deselect the one of the second ports.

* * * * *